(12) United States Patent
Gebhardt et al.

(10) Patent No.: US 7,867,542 B2
(45) Date of Patent: Jan. 11, 2011

(54) NON-FLAMMABLE RELEASE COMPOSITION

(75) Inventors: Robert Gebhardt, Bartlett, TN (US); Paul Friedman, Germantown, TN (US); Melissa Riddell, Brunswick, GA (US)

(73) Assignee: ACH Food Companies, Inc., Cordova, TN (US)

( * ) Notice: Subject to any disclaimer, the term of this patent is extended or adjusted under 35 U.S.C. 154(b) by 952 days.

(21) Appl. No.: 11/616,987

(22) Filed: Dec. 28, 2006

(65) Prior Publication Data

US 2008/0160136 A1 Jul. 3, 2008

Related U.S. Application Data

(60) Provisional application No. 60/864,072, filed on Nov. 2, 2006.

(51) Int. Cl.
*A23D 7/005* (2006.01)

(52) U.S. Cl. ...................... 426/609; 426/811

(58) Field of Classification Search ................ 426/609
See application file for complete search history.

(56) References Cited

U.S. PATENT DOCUMENTS

| | | | |
|---|---|---|---|
| 4,142,003 A | 2/1979 | Sejpal | |
| 4,163,676 A | 8/1979 | Konigsbacher | |
| 4,188,412 A | 2/1980 | Sejpal | |
| 4,339,465 A | 7/1982 | Strauss | |
| 4,547,388 A | 10/1985 | Strauss | |
| 4,560,569 A | 12/1985 | Ivers | |
| 4,960,606 A | 10/1990 | Crosby | |
| 4,961,951 A | 10/1990 | Crosby | |
| 5,156,876 A | 10/1992 | Clapp et al. | |
| 5,296,021 A | 3/1994 | Clapp et al. | |
| 5,374,434 A | 12/1994 | Clapp et al. | |
| 5,431,719 A | 7/1995 | Clapp et al. | |
| 5,455,055 A | 10/1995 | Stoltz | |
| 5,487,913 A | 1/1996 | Fackrell et al. | |
| 5,503,866 A | 4/1996 | Wilhelm, Jr. | |
| 5,552,163 A | 9/1996 | Hartman et al. | |
| 5,567,456 A | 10/1996 | Clapp et al. | |
| 5,650,185 A | 7/1997 | Stoltz | |
| 5,658,374 A | 8/1997 | Glover | |
| 6,113,970 A | 9/2000 | Rainey et al. | |
| 6,123,977 A | 9/2000 | Diamond | |
| 6,140,519 A | 10/2000 | Hutton et al. | |
| 6,210,743 B1 | 4/2001 | Clapp et al. | |
| 6,391,837 B1 | 5/2002 | Coleman | |
| 6,613,376 B2 | 9/2003 | Smith et al. | |
| 6,623,780 B1 | 9/2003 | Stevens et al. | |
| 6,699,315 B2 | 3/2004 | Augello et al. | |
| 6,749,874 B2 | 6/2004 | Paul et al. | |
| 6,793,959 B2 | 9/2004 | Nakhasi et al. | |
| 6,852,349 B2 | 2/2005 | Smith et al. | |
| 6,905,722 B2 | 6/2005 | Liu | |
| 7,037,550 B2 | 5/2006 | Liu et al. | |
| 7,638,154 B2 * | 12/2009 | Paul et al. ................... 426/609 |
| 2003/0211222 A1 | 11/2003 | Paul et al. | |
| 2004/0191373 A1 | 9/2004 | Paul et al. | |
| 2004/0241291 A1 | 12/2004 | Liu et al. | |
| 2005/0003065 A1 | 1/2005 | Liu | |
| 2006/0099320 A1 | 5/2006 | Paul et al. | |
| 2006/0122082 A1 | 6/2006 | Paul | |

FOREIGN PATENT DOCUMENTS

JP 54-38282 3/1979

OTHER PUBLICATIONS

Office Action dated May 19, 2010 for U.S. Appl. No. 11/975,850.
Office Action dated May 18, 2007 for U.S. Appl. No. 10/817,576.
Office Action dated Jan. 31, 2007 for U.S. Appl. No. 10/817,576.
Office Action dated Feb. 13, 2009 for U.S. Appl. No. 11/317,491.
Anonymous, "Lecithin Powder Breaks Through HLB Threshold," Food Ingredient News, vol. 3(5) (May 1, 1996) pp. 1-2.
International Search Report dated Nov. 28, 2001 for Application No. PCT/US01/25217.

* cited by examiner

*Primary Examiner*—Carolyn A Paden
(74) *Attorney, Agent, or Firm*—Frost Brown Todd, LLP

(57) ABSTRACT

An aqueous non-flammable release composition for use in food preparation comprising water; de-oiled, powdered lecithin; and less than about 10% oil. The de-oiled, powdered lecithin is water miscible which facilitates the use of less or no oil in a release composition, and allows the use of a non-flammable propellant. The non-flammable release composition may be applied to cooking utensils, such as baking and frying pans, and especially grills and the like, in order to prevent or inhibit food from sticking during cooking and to facilitate cleaning; which may be safely applied while a utensil, pan, or grill is hot; near an open flame or heating element; or while food is being cooked.

14 Claims, No Drawings

NON-FLAMMABLE RELEASE COMPOSITION

CROSS REFERENCE TO RELATED APPLICATIONS

The present application hereby claims the benefit of the provisional patent application of the same title, patent application Ser. No. 60/864072, filed on Nov. 2, 2006, the disclosure of which is hereby incorporated by reference in its entirety.

BACKGROUND OF THE INVENTION

The present invention relates, in general to a release composition of the type applied to cooking utensils, such as baking and frying pans, and especially grills and the like, in order to prevent or inhibit food from sticking during cooking and to facilitate cleaning; which may be applied while a utensil, pan, or grill is hot; near an open flame or heating element; or while food is being cooked.

Release compositions (often called cooking sprays) are a useful aid for cooking. They are applied as a coating, which may be used in lieu of oils, grease, butter, etc., to lubricate the food-contacting surfaces of cooking utensils such as frying and baking pans, and facilitate separation of the cooked foodstuffs from the cooking surfaces and utensils without damaging the food and assisting the cleanup of the cooking surface or utensil. Often the spray is applied to the cooking surface or utensil before cooking, although it may be applied or reapplied during cooking. They may be applied from a squeeze bottle, low pressure finger pump actuated container, aerosol container, or the like.

The typical release composition can include lecithin, water, and edible oil. The use of liquid lecithin is well known as part of conventional food release compositions. It is a naturally-occurring substance usually obtained from soybean oil, sunflower oil, or other edible oils. Lecithin is mostly a mixture of glycolipids, triglycerides, and phospholipids (e.g. phosphatidylcholine, phosphatidylethanolamine, and phosphatidylinositol).

The amount of water added to a typical release composition is selected so as to partially hydrate the lecithin or, more accurately, so as to partially hydrate the phosphatide portion of the lecithin so as to render the partially hydrated lecithin insoluble in an edible oil. The amount of water added should not be so great as to fully hydrate the lecithin. Partially hydrated lecithins in release compositions provide clear, amber colored, platelet-like materials of a viscosity which can be readily handled and dispensed through preferred means such as conventional aerosol spray cans. Too little water in the composition will not render the lecithin insoluble in an edible oil, and consequently will not provide a readily dispersible non-foaming dispersion. Excessive water, in addition to contributing to problems of bacterial growth and rancidity, will result in a milky or cloudy composition.

Edible oils such as canola, partially hydrogenated winterized canola, corn, olive, peanut, cottonseed, safflower, soy, partially hydrogenated winterized soy, and sunflower oils, are also a common ingredient in release compositions. The edible oil component generally constitutes the largest single component of the food release composition and serves as the vehicle for the lecithin, water and any other ingredients.

A propellant is usually present in an amount at least sufficient to facilitate the delivery of an acceptable quantity of the release composition from a pressurizable container, i.e., a conventional aerosol spray can. A typical proportion of propellant may range from about 10 to 75 percent by weight of the composition. Generally, liquefiable compressed gas propellants comprise hydrocarbons, including propane, isobutane and n-butane, closely related dimethylether and fluorinated hydrocarbons such as difluoroethane (HFC-152), trifluoroethane (HFC-143B), tetrafluoroethane (HFC-134A), trifluoromethane (HFC-23) and mixtures thereof.

The presence of edible oils and hydrocarbons can increase the flammability of typical release compositions. A need exists for a release composition which may be applied while a utensil, pan, or grill is hot; near an open flame or heating element; or while food is being cooked.

BRIEF SUMMARY OF THE INVENTION

The invention overcomes the above-noted and other deficiencies of the prior art by providing a release composition for use in food preparation comprising: a) between about 65% and about 98% by weight water; b) between about 2% and about 12% by weight de-oiled, powdered lecithin; and c) less than about 10% oil. The release composition may additionally comprise a suitable propellant, and other additives.

According to another aspect of the invention, the release composition for use in food preparation comprises: a) between about 65% and about 98% by weight water; and b) between about 2% and about 12% by weight de-oiled, powdered lecithin; wherein any lecithin in the composition is only de-oiled, powdered lecithin. The release composition may additionally comprise a suitable propellant, and other additives.

DETAILED DESCRIPTION OF THE INVENTION

According to one embodiment of the invention, the release composition for use in food preparation comprises: a) between about 65% and about 98% by weight water; b) between about 2% and about 12% by weight de-oiled, powdered lecithin; and c) less than about 10% oil.

Another embodiment of the invention is a release composition for use in food preparation comprising: a) between about 65% and about 98% by weight water; and b) between about 2% and about 12% by weight de-oiled, powdered lecithin; wherein the lecithin in the composition is only de-oiled, powdered lecithin.

Water comprises the majority of the release composition. The water can be de-ionized water, reverse-osmosis purified water, boiled water, natural spring water, and tap water. By mixing water with a small amount of oil, or using no oil, the flammability of the release composition is reduced. The water content may be between about 85% and about 95% by weight, or even between about 92% and about 95% by weight.

Lecithin is mostly a mixture of glycolipids, triglycerides, and phospholipids (e.g. phosphatidylcholine, phosphatidylethanolamine, and phosphatidylinositol). Commercially available lecithins may contain the above components in various combinations and proportions. In liquid form, the lecithin is usually dissolved in soybean oil and is available in different viscosities. Liquid lecithin may be unbleached or, in order to lighten its color, it may be bleached, usually by peroxides, and may be filtered or otherwise refined. To the extent that it is present in a release composition of the present invention at all, it is between about 0% and about 10% by weight, or between about 0% and about 1%. In one embodiment, no liquid lecithin is present at all, only de-oiled powdered lecithin is used.

The use of de-oiled, powdered lecithin facilitates the use of less or no oil in the release composition. De-oiled, powdered lecithin is considerably more dispersible in water than other forms of lecithin including liquid lecithin. The de-oiled, powdered lecithin content may be between about 2% and about 8% by weight, or even between about 3% and about 5% by weight.

De-oiled, powdered lecithins are produced by Central Soya Company, Ft. Wayne, Ind., and marketed as Precept™ Lecithins. An example of a dry hydroxlated lecithin is Precept # 8120 which has good emulsion stability and is relatively hydrophilic. A dry, enzyme modified lecithin, treated with phospholipase enzyme, is Precept # 8160. Another Precept lecithin is # 8140, which resists darkening upon heating, has a faint bland taste, and is preferred for use as a pan release and/or cooking spray products. Although Precept # 8140 is preferred, all of the Precept products may be employed in release compositions.

Reducing the quantity of oil in the release composition reduces the flammability of the composition. In addition, it makes the composition less viscous and facilitates the use of a non-flammable propellant. To the extent oil is present, any suitable edible oil or mixture of edible oils may be used in the release composition of the present invention. Such oils include, by way of example, canola, partially hydrogenated winterized canola, corn, olive, peanut, cottonseed, safflower, soy, partially hydrogenated winterized soy, and sunflower oils. The edible oil component generally constitutes a small component of the release composition and may serve to help disperse the lecithin and any other ingredients. The oil content may be less than about 5% by weight, or the release composition may consist of substantially no oil, or even no oil.

Additives may be used in the release composition, such as vitamins, flavors, preservatives, antioxidants, anti-fungal, anti-mold, and anti-bacterial compositions. Examples of additives are: potassium sorbate, lactic acid, sorbic acid, natural hickory flavor, smoke flavor, grill type flavors, and other flavorings. Lactic acid may be used to retard microbial growth. Potassium sorbate may be used to inhibit mold growth. One or more of the additives may be used together. Use of other additives will be clear to one of ordinary skill in the art.

The release composition may comprise one or more propellants. Propellants are well known in the art. The propellant is useful for dispensing the release composition as an aerosol. Examples of gas propellants are carbon dioxide, nitrous oxide, air, and nitrogen. Non-flammable propellants are desirable. Propellants may make up between about 0% and about 1.5% by weight of the composition, or between about 0.4% and about 1.2% by weight of the composition.

A delivery system may be used to dispense the release composition for use in food preparation. An example of which is a container such as a squeeze bottle, a low pressure finger pump actuated container, and an aerosol container.

EXAMPLE 1

A release composition in accordance with the present invention was prepared. The composition prepared for this example comprised filtered water (94.35%), Precept 8140 de-oiled, powdered lecithin (4%), potassium sorbate (0.1%), lactic acid (0.5%), nitrogen (0.8%), and natural hickory flavor (0.25%).

The release combination was formed by adding the Precept 8140 de-oiled, powdered lecithin, potassium sorbate, lactic acid and flavoring to filtered water heated to around 120° F. The mixture was agitated for 10 to 15 minutes, then put in an aerosol can and charged with the nitrogen.

This example release composition did not cause a flame up when sprayed on a grill with an open flame. In addition, food cooked on a grill sprayed with this example composition did not stick to the grill.

EXAMPLE 2

Another release composition in accordance with the present invention was prepared. The composition was prepared as described in Example 1, and comprised filtered water (94.35%), Precept 8140 de-oiled, powdered lecithin (4%), potassium sorbate (0.1%), lactic acid (0.5%), air (0.8%), and flavoring (0.25%).

This example release composition did not cause a flame up when sprayed on a grill with an open flame. In addition, food cooked on a grill sprayed with this example composition did not stick to the grill.

EXAMPLE 3

A release composition in accordance with the present invention was prepared. The composition was prepared as described in Example 1, and comprised filtered water (94.35%), Precept 8140 de-oiled, powdered lecithin (4%), potassium sorbate (0.1%), lactic acid (0.5%), carbon dioxide (0.8%), and flavoring (0.25%).

This example release composition did not cause a flame up when sprayed on a grill with an open flame. In addition, food cooked on a grill sprayed with this example composition did not stick to the grill.

EXAMPLE 4

A comparative composition not in accordance with the present invention was prepared. The composition prepared for this example comprised filtered water (75.0%), corn oil (20.6%), Precept 8140 de-oiled, powdered lecithin (3.0%), potassium sorbate (0.1%), lactic acid (0.5%), and nitrogen (0.8%).

This composition in comparison to examples 1 through 3 caused a flame up when sprayed on a grill with an open flame. In addition, food cooked on a grill sprayed with this example composition stuck to the grill more than in examples 1 through 3.

EXAMPLE 5

A comparative composition not in accordance with the present invention was prepared. The composition prepared for this example comprised filtered water (67.1628%), soybean oil (27.06%), oiled lecithin (4.86%), potassium sorbate (0.1%), sorbic acid (0.0472%), and nitrogen (0.8%).

This composition in comparison with examples 1 through 3 caused a flame up when sprayed on a grill with an open flame. In addition, food cooked on a grill sprayed with this example composition stuck to the grill more than in examples 1 through 3.

When used herein "% by weight" is in relation to the release composition, i.e. 65% by weight water means that 65% of the release composition is water.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A release composition for use in food preparation comprising:
   a) between about 65% and about 98% by weight water;
   b) between about 2% and about 12% by weight de-oiled, powdered lecithin; and
   c) less than about 10% oil;
   and further comprising a propellant selected from carbon dioxide, nitrous oxide, air, and nitrogen.

2. A release composition of claim 1, wherein the composition comprises between about 85% and about 95% by weight water.

3. A release composition of claim 1, wherein the composition comprises between about 92% and about 95% by weight water.

4. A release composition of claim 1, wherein the composition comprises between about 2% and about 8% by weight de-oiled, powdered lecithin.

5. A release composition of claim 1, wherein the composition comprises between about 3% and about 5% by weight de-oiled, powdered lecithin.

6. A release composition of claim 1, further comprising one or more additives selected from vitamins, flavors, preservatives, antioxidants, anti-fungal, anti-mold, and anti-bacterial compositions.

7. A release composition of claim 1, wherein the composition comprises between about 92% and about 95% by weight water; between about 3% and about 5% by weight de-oiled, powdered lecithin; and one or more additives selected from vitamins, flavors, preservatives, antioxidants, anti-fungal, anti-mold, and anti-bacterial compositions.

8. A release composition for use in food preparation comprising:
   a) between about 65% and about 98% by weight water; and
   b) between about 2% and about 12% by weight de-oiled, powdered lecithin;
   wherein any lecithin in the composition is de-oiled, powdered lecithin; and further comprising a propellant selected from carbon dioxide, nitrous oxide, air, and nitrogen.

9. A release composition of claim 8, wherein the composition comprises between about 85% and about 95% by weight water.

10. A release composition of claim 8, wherein the composition comprises between about 92% and about 95% by weight water.

11. A release composition of claim 8, wherein the composition comprises between about 2% and about 8% by weight de-oiled, powdered lecithin.

12. A release composition of claim 8, wherein the composition comprises between about 3% and about 5% by weight de-oiled, powdered lecithin.

13. A release composition of claim 8, further comprising one or more additives selected from vitamins, flavors, preservatives, antioxidants, anti-fungal, anti-mold, and anti-bacterial compositions.

14. A release composition of claim 8, wherein the composition comprises between about 92% and about 95% by weight water; and the composition comprises between about 3% and about 5% by weight de-oiled, powdered lecithin; and one or more additives selected from vitamins, flavors, preservatives, antioxidants, anti-fungal, anti-mold, and anti-bacterial compositions.

* * * * *